United States Patent [19]
Klein

[11] Patent Number: 4,571,027
[45] Date of Patent: Feb. 18, 1986

[54] ADJUSTABLE REAR VIEW MIRROR

[75] Inventor: Manfred Klein, Leichlingen, Fed. Rep. of Germany

[73] Assignee: Metallwerk Frese GmbH, Leichlingen, Fed. Rep. of Germany

[21] Appl. No.: 532,309

[22] Filed: Sep. 15, 1983

[30] Foreign Application Priority Data

Dec. 30, 1982 [DE] Fed. Rep. of Germany ... 8236802[U]

[51] Int. Cl.$^4$ ............................................... B60R 1/06
[52] U.S. Cl. .................................. 350/280; 350/484; 250/215
[58] Field of Search ............... 350/280, 289, 605, 632, 350/637

[56] References Cited

U.S. PATENT DOCUMENTS 2,691,919 10/1954 Springer .............................. 350/280
2,906,098 9/1959 Mayo .................................. 350/289

Primary Examiner—John K. Corbin
Assistant Examiner—Rebecca D. Gass
Attorney, Agent, or Firm—Schwartz, Jeffery, Schwaab, Mack, Blumenthal & Evans

[57] ABSTRACT

An adjustable rear view mirror for vehicles, such as cars. This mirror comprises a vacuum box having two plates which may be tilted with respect to one another. The mirror housing is attached to one of these plates and the mirror element which is wedge-shaped in cross section, is attached to the other plate. In order to adjust the mirror element, a vacuum is produced in the vacuum box which causes a tilting movement of the plate holding the mirror with respect to a restoring spring. For automatic control, a photocell may be provided which adjusts a control valve, of the vacuum system, upon the incidence of a certain minimum amount of light. However, a mechanically actuated directional control valve may also be used for the control.

11 Claims, 8 Drawing Figures

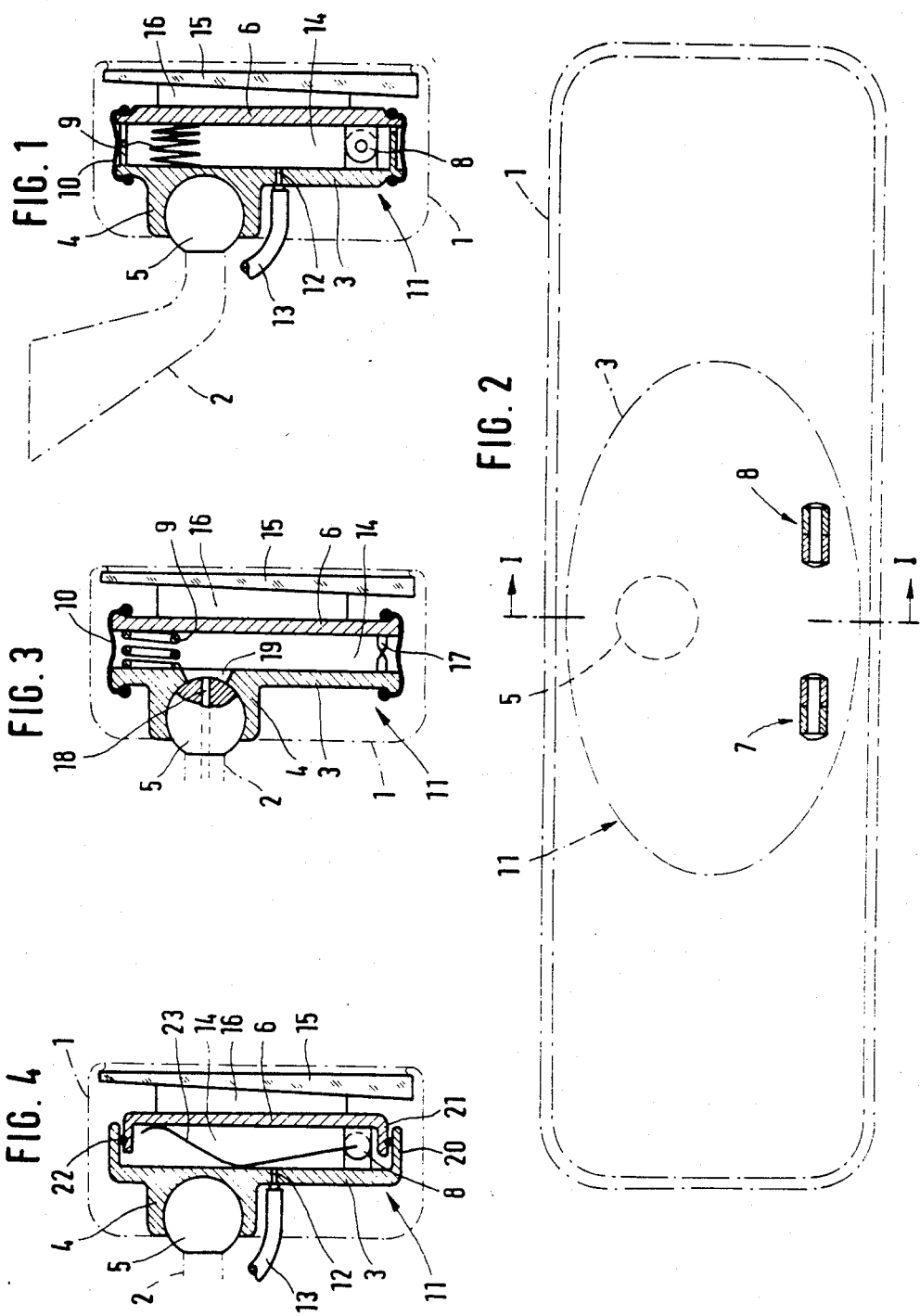

ADJUSTABLE REAR VIEW MIRROR

BACKGROUND OF THE INVENTION

1. Field of the Invention

This invention relates to an adjustable rear view mirror for motor vehicles, such as cars, which has a bearing, such as a bearing plate, secured on a supporting arm, and a mirror element which may be adjusted with respect to this bearing between two tilt positions.

2. Description of the Prior Art

Adjustable rear view mirrors for attachment to the inside of a vehicle and to the outside of its body are known. In the first-mentioned case, the mirror element is wedge-shaped in cross section and may be tilted about a generally horizontal axis, so that, depending on the tilt position, the front or the back of the mirror element causes most of the mirror reflection, in order that, upon the occurrence of dazzling light, the mirror may be brought into a non-dazzling position. On the other hand, in the case of external rear view mirrors having a mirror element adjustable between two positions, this element is mounted in a housing such that it may be tilted about a generally vertical axis, so that it is possible to adjust the mirror before changing lane, to detect the so-called dead angle. In the latter case, the mirror element may be adjusted via the indicator, i.e. the element is tilted into a position which detects the dead angle when the indicator lever is operated to indicate a change of lane, in particular when the driver is going to move into the overtaking lane.

In the case of adjustable rear view mirrors which are already known, the mirror element is adjusted mechanically by hand or electrically by means of electromotors or operating magnets. Adjustment by hand is a well known method of operation in the case of an internal rear view mirror, but it has the disadvantage that additional hand movements are necessary requiring the alertness of the driver and diverting his attention from the real task of observing what is happening on the road. Adjustment by means of electromotors or electromagnets is relatively complicated and thus expensive, because special drive elements, namely the electromotors or electromagnets, are necessary which increase the weight of the mirror and thus increase the risk of vibration.

An object of the present invention is to improve the adjustment of adjustable rear view mirrors for motor vehicles and to provide a novel, automatically operable adjusting device for the mirror element which is economically favourable and reliable in operation and does not unnecessarily increase the weight of the mirror.

SUMMARY OF THE INVENTION

According to the present invention an adjustable rear view mirror is provided which has a vacuum system for the adjustment of the mirror element. In contrast with known adjustable rear view mirrors, the mirror element is thus not adjusted manually or electrically, but by means of a vacuum which may easily be produced by, for example, connecting the vacuum system, to the suction manifold, for example, of the vehicle engine downstream of the pressure safety valve. Since the mirror element is to be adjusted only when the engine is running, i.e. while the vehicle is travelling, a closed vacuum system does not need to be used. Instead, it is sufficient if the vacuum is directly produced by the running engine.

A photocell is preferably provided as a trigger to operate the vacuum system. This photocell provides a control signal to adjust a control valve of the vacuum system when there is a certain minimum amount of light incident on the photocell. Thus, an automatic adjustment is ensured, and that is, when a vehicle having very bright headlights moves up from behind. Therefore, in the normal case, the rear view mirror is located in the conventional mirror position, i.e. a dimming effect only takes place when it is really necessary.

The vacuum system preferably comprises a vacuum box which may be composed of parts which are installed in the housing and may be tilted with respect to one another, or may be formed from the mirror housing itself. A vacuum box of this type may also be produced relatively simply and thus cheaply for mass produced articles.

BRIEF DESCRIPTION OF THE DRAWINGS

Embodiments of the adjustable rear view mirror according to the present invention are shown schematically in the drawings, in which:

FIG. 1 shows a vertical cross section of an embodiment of the rear view mirror along line I—I in FIG. 2;

FIG. 2 is a front view of the rear view mirror of FIG. 1, the front parts having been omitted;

FIG. 3 shows a vertical cross section, similar to that shown in FIG. 1, of another embodiment of the rear view mirror;

FIG. 4 shows a vertical cross section of a further embodiment of the adjustable rear view mirror;

DETAILED DESCRIPTION OF PREFERRED EMBODIMENTS

Figure 7:
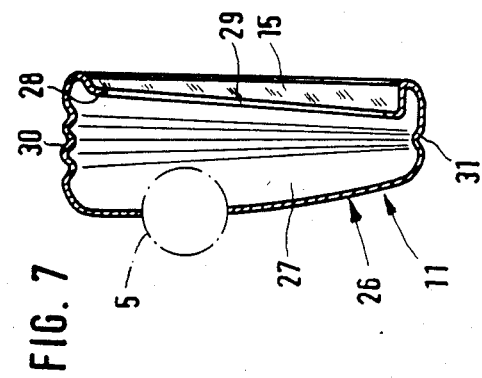
FIG. 7 shows a vertical section according to another embodiment of the adjustable rear view mirror.

An adjustable rear view mirror for vehicles, such as cars is shown in FIGS. 1 and 2 which has a housing 1 located on an arm 2 on the body of the vehicle, in a manner which is not shown in detail. The housing 1 accommodates a bearing plate 3 which has an attachment 4 designed as a joint socket in which a ball 5 provided on the arm 2 is positioned, so that the bearing plate 3 is hinged to the arm 2.

The bearing plate 3 is attached to the housing 1, by means of the attachment 4 so that the housing 1 together with the bearing plate 3, may be adjusted with respect to the arm 2.

A supporting plate 6 is positioned on the front of the bearing plate 3 and is connected to the bearing plate 3 by means of two hinges 7 and 8 so that it is tiltable. The hinges 7 and 8 are located in the lower region of the bearing plate 3 and the supporting plate 6. A pressure spring 9 extends in the upper region between the bearing plate 3 and the supporting plate 6 and forces these two plates apart into the position shown in FIG. 1. An encircling collapsible bellows 10 overlaps the two plates 3 and 6 and prevents them from being forced apart further than is shown in FIG. 1, i.e. the bellows 10 determines one end position, shown in FIG. 1, of the plates 3 and 6 to which they may be tilted with respect to one another. Moreover, the bellows 10 forms an air-tight seal with the outside, so that the bearing plate 3, the supporting plate 6 and the bellows 10 form, towards the outside, an encapsulated vacuum box 11. This vacuum box is oval in a top view, as shown by FIG. 2.

The bearing plate 3 contains a through opening 12, to which a tube 13 is connected and which may also be connected to a suction line (not shown) to produce a vacuum in the interior 14 of the vacuum box 11. If this vacuum is great enough to overcome the force of the pressure spring 9, the supporting plate 6 is pivoted about the hinges 7 and 8 in the direction of the bearing plate 3, as a result of which a mirror element 15 which is secured to the supporting plate 6 by means of a spacer 16 is tilted into one tilt position from the position shown in FIG. 1. This tilt position corresponds to the non-dazzling position of the mirror element 15 which is wedge-shaped in cross section.

As soon as the vacuum in the interior 14 has been counterbalanced again, for example by interrupting the connection between the tube 13 and the suction line (not shown), the pressure spring 9 forces the supporting plate 6 back into the starting position shown in FIG. 1, which corresponds to the normal mirror position of the mirror element 15.

The embodiment according to FIG. 3 differs from the embodiment according to FIG. 1 essentially in that the bearing plate 3 and the supporting plate 6 are hinged together by means of film hinges 17. Furthermore, the supporting arm 2 and the ball 5 located thereon contains a continuous bore 18 which extends into an opening 19 leading into the socket joint of the attachment 4, and by which the vacuum required in the interior 14 to adjust the supporting plate 6 is produced.

In the embodiment according to FIG. 4, the bearing plate 3 is provided with an encircling, projecting edge 20 which overlaps a similar encircling projecting edge 21 of the supporting plate 6. An O-ring 22 is provided as a seal between the two edges 20 and 21 in order to seal the interior 14 of the vacuum box 11 from the outside so that the vacuum required for the adjustment may be produced in the interior 14. A leaf spring 23 forces the bearing plate 3 and the supporting plate 6 apart, and the hinges 7 and 8 may have end stops which determine one end position of these two plates namely, that shown in FIG. 4. The other end position of the tiltably interconnected plates 3 and 6 may be determined, for example, by the encircling edge 21 of the supporting plate 6, i.e. when this comes into contact with the front of the bearing plate 3.

Figure 5:
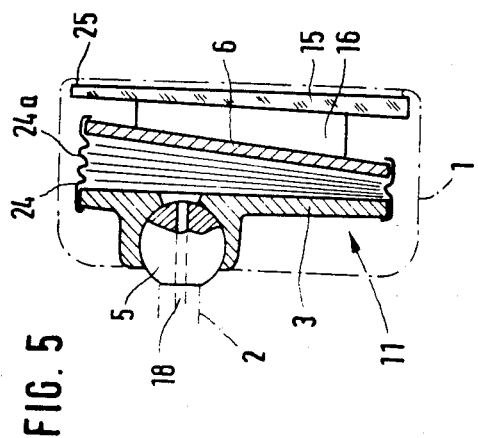
FIG. 5 shows a vertical cross section of a still further embodiment of the adjustable rear view mirror.
Figure 6:
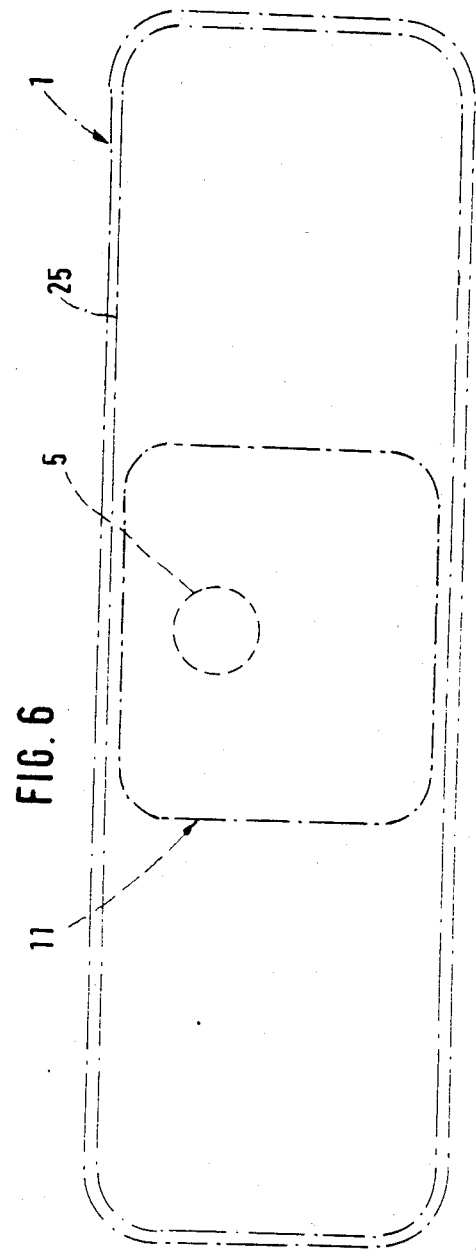
FIG. 6 is a front view of the rear view mirror of FIG. 5, the individual parts being indicated in outline only.

In the embodiment shown in FIGS. 5 and 6, the plates 3 and 6 forming the box 11 are substantially rectangular in a top view, as shown by FIG. 6. Both plates 3 and 6 are surrounded by a flexible bellows 24 which is designed in the form of a concertina, the design being such that the bearing plate 3 and the supporting plate 6 are positioned obliquely with respect to one another in the normal starting position of the mirror element 15, as shown in FIG. 5. This position may be determined such that the mirror element 15 is positioned from the inside on an encircling edge 25 located on the front of the housing 1. The tilt position of the mirror element 15 is determined either by an end stop (not shown) between the plates 3 and 6 or in that the folds 24a of the collapsible bellows 24 lie next to one another so as to prevent a further tilt movement of the supporting plate 6 with respect to the bearing plate 3.

In the embodiment shown in FIG. 7, the housing 26 is itself flexible, so that the tilt movements of the mirror element 15 are caused by movements of the housing wall.

In this embodiment, the housing 26 which is, for example, injection moulded in one piece from plastics material forms the air-tight, encapsulated vacuum box 11. The ball 5 of the supporting arm 2 which is not shown in detail, projects from the back into the housing 26 such that an air-tight seal is ensured. The ball 5 contains the bore 18 shown in FIGS. 4 and 5 for producing the vacuum required to adjust the position of the mirror element 15 in the interior 27 of the housing 26.

A recess 28 is provided in the front of the housing 26 which accommodates the mirror element 15 which has a wedge-shaped cross section. This mirror element 15 forms an air-tight seal, in a case where the bottom of the recess 28 contains an opening 29, as shown in FIG. 7.

The encircling side wall of the housing 26 is provided with a bellows-shaped corrugated region 30 which contracts if a sufficient vacuum is produced in the interior 27 of the housing 26, so that the plate glass 15 is moved into a tilt position from the position shown in FIG. 7. FIG. 7 shows that the corrugated region 30 is wider in the upper region of the housing 26 than in the lower region, so that the desired tilt movement of the plate glass 15 takes place about the single lower corrugation 31 which acts as a type of hinge.

An end stop (not shown) may be provided in the housing 26 to restrict the tilt movement of the mirror element 15.

Figure 8:
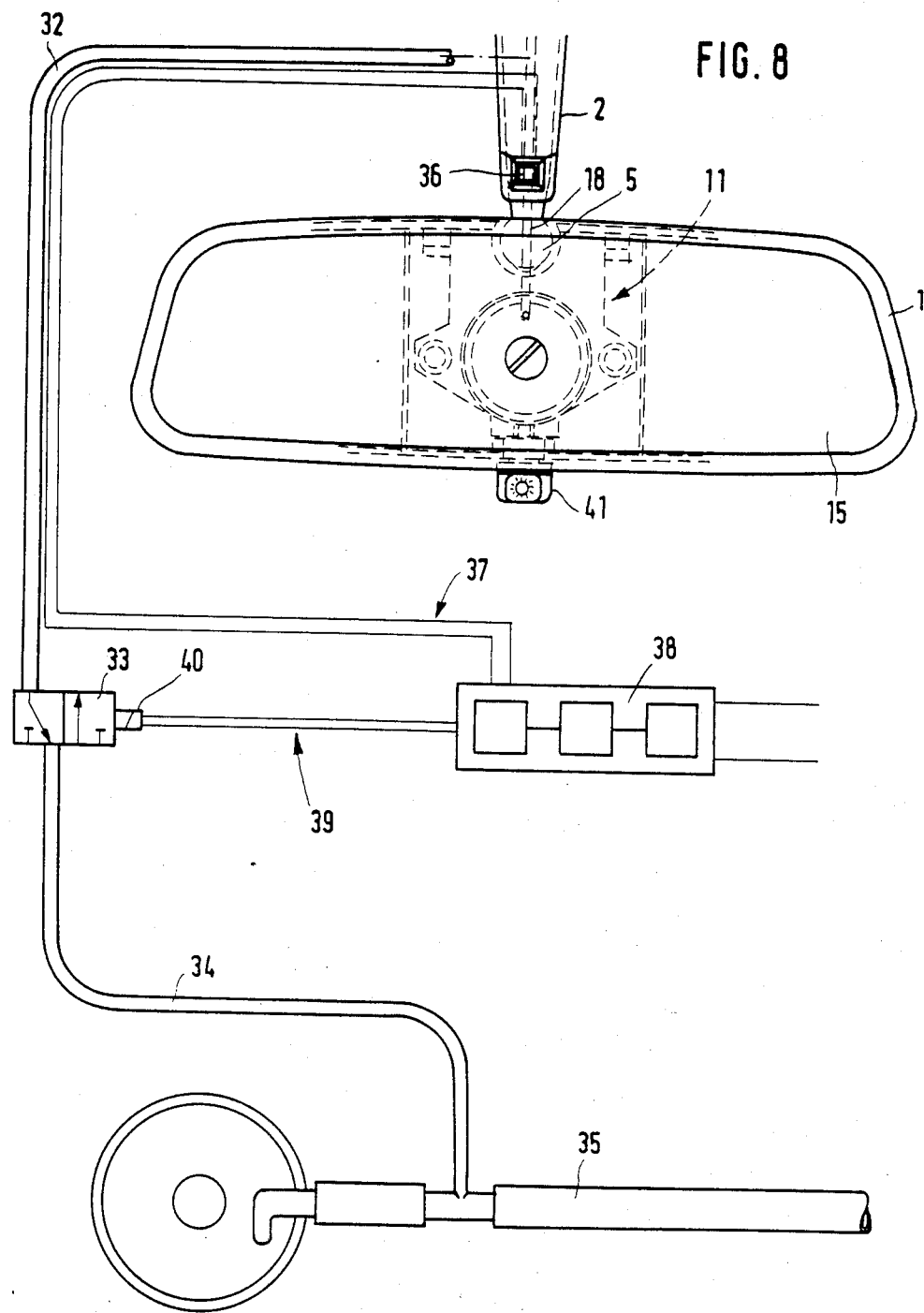
FIG. 8 is a front view of an embodiment of an adjustable internal rear view mirror for vehicles having an adjusting device which is shown in the form of a block diagram.

FIG. 8 indicates how the adjustment of the mirror element 15 can be achieved automatically by means of a vacuum.

A hose line 32 which leads to a slide valve 33 is connected to the bore 18 penetrating the ball 5 and the arm 2 or, in the embodiments according to FIGS. 1 and 4, is connected to the tube 13. This slide valve may connect the hose line 32 to another hose line 34 in the position shown in FIG. 8, which hose line 34 is connected to a suction pipe 35 which is connected to the suction manifold (not shown) of the engine of the vehicle When the slide valve 33 is in the position shown in FIG. 8, the hose lines 32 and 34 are interconnected, so that the vacuum prevailing in the suction pipe 35 extends into the hose lines 34 and 32 and is also produced in the vacuum box 11 through the bore 18. Consequently, the mirror element 15 is moved into the tilted, non-dazzling position in the above-mentioned manner.

For automatic control of the adjustment of the mirror element 15, a photocell 36 is provided on the arm 2. If light of a certain minimum intensity impinges on the photocell 36, for example, if a vehicle which is on main beam, or whose headlights are too bright, moves up behind a vehicle equipped with this rear view mirror, the photocell 36 emits an electrical control signal which is fed to a switching electronic circuitry 38 via cabling 37. This switching circuitry 38 emits a control signal to a switching magnet 40 via cabling 39, which magnet 40 adjusts the slide of the slide valve 33. FIG. 8 shows the condition in which an increased amount of light impinges on the photocell 36, so that the slide of the slide valve 33 has been moved into the suction position.

As soon as the amount of light incident on the photocell 36 falls below a certain threshold value, the photocell 36 no longer supplies control signals to the switching circuitry 38 and thus, switching signals are no longer fed to the switching magnet 40. Accordingly, the slide of the slide valve 33 is moved such that the connection between the hose lines 32 and 34 is discontinued. Consequently, the hose lines 32 and 34 are connected to the outside air, so that the vacuum in the vacuum box 11 is reduced and the mirror element 15 returns to its starting position.

In order to prevent the photocell 36 from emitting a control signal to the switching circuitry 38 during the day and, in particular, when the day light is particularly bright, a second photocell may be provided as a comparison meter. This second photocell is to be positioned so that it cannot be affected by the light from the headlights of another vehicle moving up from behind. In this case, the photocell 36 only acts to tilt the mirror element when a certain minimum difference exists between the quantity of light falling on each photocell.

A grip 41 is provided on the lower side of the housing 1. The supporting plate 6 of the vacuum box 11 may also be adjusted by hand using this grip 41, for example, if the automatic switching element fails to work.

What is claimed is:

1. An adjustable rear view mirror for vehicles comprising: a bearing secured on a supporting arm, a bearing plate secured to said supporting arm by said bearing, a mirror element, a supporting plate attached to said mirror element, said supporting plate being tiltable with respect to the bearing plate such that said mirror element is adjustable with respect to the bearing between two tilt positions, a housing for the mirror element, said housing being secured to said bearing plate, and a vacuum system provided for the adjustment of said supporting plate and mirror element, said vacuum system comprising a vacuum box connected to a suction line, said vacuum box comprising said bearing plate and said supporting plate.

2. A mirror according to claim 1, wherein at least one photocell is provided which produces control signals to adjust a control valve of the vacuum system, depending on the intensity of the incident light.

3. A mirror according to claim 1, wherein a directional control valve is provided as a trigger to operate the vacuum system.

4. A rear view mirror according to claim 1, wherein the supporting plate is tiltably connected to the bearing plate by means of a swivel joint close to one edge thereof and a pressure spring is provided opposite the swivel joint between said supporting plate and said bearing plate, being pre-tensioned so as to force the supporting plate and bearing plate apart.

5. A rear view mirror according to claim 1, wherein the bearing plate and the supporting plate are interconnected at their edges via a movable seal.

6. A rear view mirror according to claim 6, wherein the seal is a collapsible bellows which overlaps the two plates.

7. An adjustable rear view mirror for vehicles comprising: a bearing secured on a supporting arm, a mirror element adjustable with respect to the bearing between two tilt positions, a vacuum system for adjustment of the mirror element with respect to the bearing between said two tilt positions, said vacuum system comprising an air tight external housing having one portion mounted to said supporting arm by said bearing and having another portion fixedly mounting said mirror element, said housing having a side wall with a collapsable zone such that said housing will flex in response to varying degrees of vacuum produced within said housing and tilt said mirror with said housing portion fixedly mounted to said mirror between said two tilt positions.

8. An adjustable rear view mirror according to claim 7 wherein said housing is a unitary molded plastic construction.

9. A mirror according to claim 7 wherein at least one photocell is provided which produces control signals to adjust a control valve of the vacuum system depending on the intensity of incident light in order to control the amount of vacuum in said housing.

10. A mirror according to claim 7 wherein a directional control valve is provided as a trigger to operate the vacuum system.

11. A rear view mirror according to claim 8 wherein said molded plastic housing has an opening behind said mirror and said mirror forms an air tight seal around said opening.

* * * * *